(No Model.) 2 Sheets—Sheet 1.

T. TRIPP.
ANTI-FRICTION BEARING.

No. 439,283. Patented Oct. 28, 1890.

WITNESSES:
Walter L. Berry.
J. Edward Porter.

INVENTOR.
Thomas Tripp.
BY
E. Frank Woodbury.
ATTORNEY (No Model.) 2 Sheets—Sheet 2.

T. TRIPP.
ANTI-FRICTION BEARING.

No. 439,283. Patented Oct. 28, 1890.

WITNESSES:—
Walter L. Perry.
J. Edward Porter.

INVENTOR.
Thomas Tripp.
BY
E. Frank Woodbury.
ATTORNEY.—

UNITED STATES PATENT OFFICE.

THOMAS TRIPP, OF AVON, ASSIGNOR TO THE TRIPP MANUFACTURING COMPANY, OF BOSTON, MASSACHUSETTS.

ANTI-FRICTION BEARING.

SPECIFICATION forming part of Letters Patent No. 439,283, dated October 28, 1890.

Application filed March 6, 1890. Serial No. 342,937. (No model.)

*To all whom it may concern:*

Be it known that I, THOMAS TRIPP, a citizen of the United States, residing at Avon, in the county of Norfolk and State of Massachusetts, have invented a new and useful Anti-Friction Bearing, of which the following is a specification.

My invention relates to anti-friction bearings designed for general use, and it especially relates to bearings designed for use upon railways.

It has for its object the production of a bearing of a special construction as regards strength, possessing great durability under severe usage.

It also has for its object the combination of a special construction and arrangement of the rolls and the mechanism for carrying the same with a thrust-plate device, which is designed as an improvement of that patented to me by United States Letters Patent No. 377,697, dated February 7, 1888.

The drawings represent the bearing as applied to a car-box designed for street-railway use.

Figure 2:
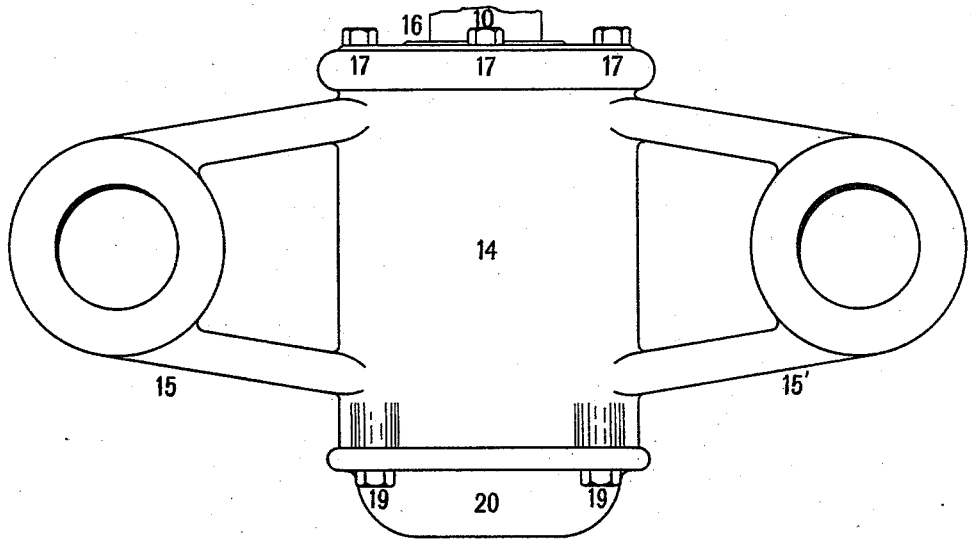
Figure 3:
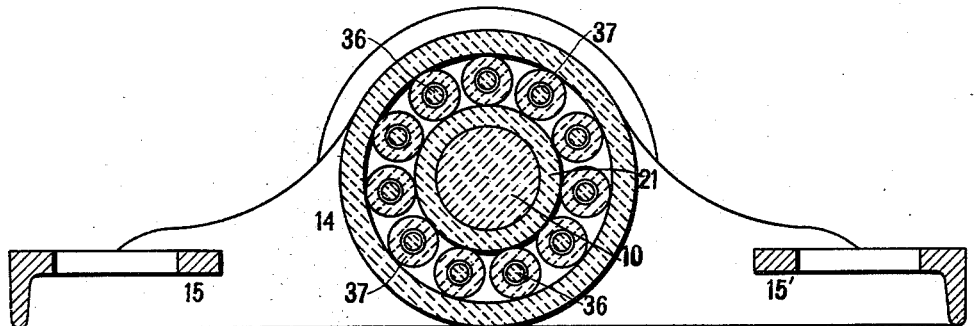
Figure 1:
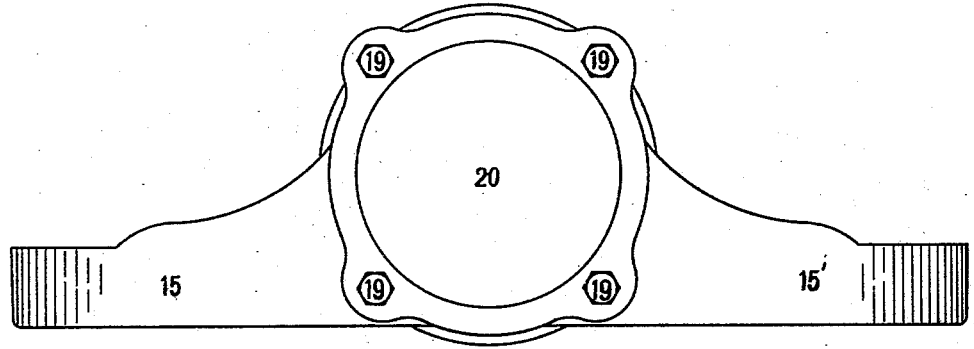
Figure 5:
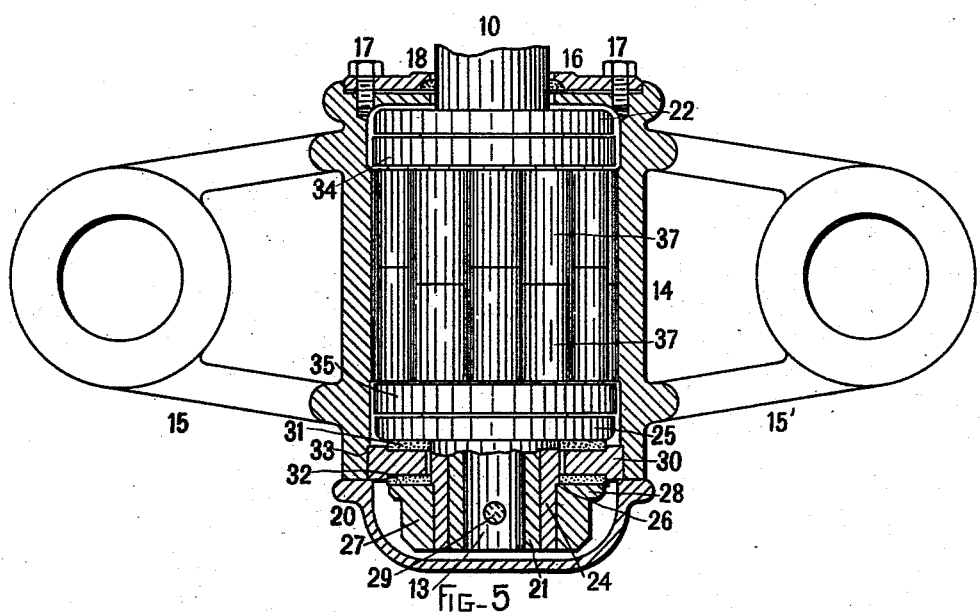
Figure 4:
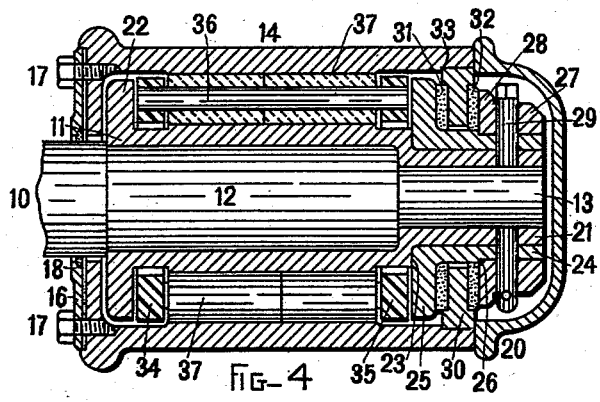
Figure 6:
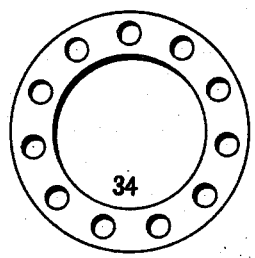

Figure 1 represents the car-box in front elevation, and Fig. 2 is a plan of the same. Fig. 3 is a central longitudinal vertical section of the box. Fig. 4 is a central vertical cross-sectional view of the box. Fig. 5 is a central horizontal sectional view of the box, and Fig. 6 represents in elevation one of the roll-carrying rings.

The axle 10 is provided with the usual shoulder 11 and the bearing 12. It is also provided with the extension portion 13, which may or may not be of the same diameter as the bearing. In many cases, however, its diameter may be less (never greater) than the bearing, as shown in the drawings.

The housing is composed of the usual cylindrical portion 14, which is provided with the ordinary arms 15 and 15'. To the rear part of the housing the packing-plate 16 is secured by the use of the bolts 17, by means of which the packing 18 is made up against the axle, so as to prevent the escape of the oil out of the box, and at the same time it acts as a dust-guard to prevent the dust from getting into the box. To the front part of the housing is bolted, by the use of the cap-bolts 19, the cap 20.

The bearing-sleeve 21, which extends from the shoulder 11 to the end of the axle, is provided with the flange 22 and the shoulder 23. The thrust-plate sleeve 24, which extends from the shoulder 23 to the end of the axle, is provided with the flange 25 and the shoulder 26. The thrust-plate collar 27, which extends from the shoulder 26 to the end of the axle, is provided with the flange 28. The sleeves 21 and 24 and the collar 27 are securely fastened to the axle by means of the taper pin 29. The thrust-plate 30, which is provided with the thrust-packings 31 and 32, designed to receive the end thrust of the axle, is held firmly in its position against the shoulder 33 of the housing by the cap 20 when it is bolted to the housing. The two roll-carrying rings 34 and 35 are permanently united by means of the roll-carrying pins 36, upon which and between the rings the rolls 37 are permitted to freely revolve. The rolls are of uneven lengths, and are so placed on the pins, as shown, that the joints between the rolls are staggered around the circle through which they revolve. It is very important that the sleeves 21 and 24 and the collar 27 should be securely held not only in their relative positions but to the axle in such a manner, as shown, so that they shall revolve with the axle, and at the same time that their flanges shall be square with the axle.

In order to accomplish these desired results it is necessary that the following construction should be closely followed: The bearing-sleeve 21 is bored to snugly fit the axle, and its length is such as will permit the sleeve to extend from the shoulder 11 on the axle to the end of the axle, and its flange 22 is exactly square with its bore. The thrust-plate sleeve 24 is bored to fit the sleeve 21, and its length is such as will permit the sleeve to extend from the shoulder 23 to the end of the axle, and its flange is square with its bore. The thrust-plate collar 27 is bored to fit the thrust-plate sleeve 24, and its length is such as will permit the collar to extend from the shoulder 26 to the end of the axle, and its flange is square with its bore. The two sleeves and the collar are securely fastened together in their relative positions and to the axle by means of the taper pin, which passes through them and the axle. This construction and arrangement compels the axle, the two sleeves, and the collar in operation to revolve as if they were but one piece only, the bores of all being strictly parallel with the axial line of the axle, and the faces of all the flanges being exactly perpendicular with said axial line.

It is essential that the path or track for the rolls should have a width, as shown, equal to the length of the rolls upon each roll-carrying pin, for the reason that if the rolls do not cover the track they will roll up ridges on the rolling-surfaces, which would tend to force the rolls out of their normal state of parallelism with the axle. The shorter the rolls are the less tendency they have to be forced out of their normal state. Therefore it is very desirable that each roll-carrying ring should carry a set of two or more rolls of odd lengths, the joints of which should lap by the joints of the adjoining set of rolls. In order to prevent the forming of any such detrimental ridges the following construction and arrangement should be adhered to closely. The interior of the box is counterbored at each side of roll-track, and the diameter of the bearing-sleeve is reduced at each side of the track. This construction leaves a track having a width for wear equal to the length of the rolls upon each roll-carrying pin, thereby effectually preventing the formation of ridges at either side of the track; and in order to prevent the formation of ridges on the track of the rolls between the sides of the track the rolls are made of odd lengths or sets, as shown, so that the joints between the rolls or sets of rolls lap by one another or are staggered around the circle through which they revolve.

The method of fastening the sleeves, collar, and axle together by means of the taper pin having a square head is a matter of considerable importance, for the reason that the taper pin not only securely fastens the parts together but when it is desired to remove the pin, by applying a wrench to its square head and turning the pin it may be quickly and easily removed, thereby saving time and obviating the usual consequence of upsetting the pin whenever it is hammered out.

What I claim as new, and desire to secure by Letters Patent, is—

1. An anti-friction bearing provided with a bearing-sleeve, a thrust-plate sleeve, and a thrust-plate collar, each of which is provided with a flange, and all being fastened together and to the axle by means of a taper pin, substantially as and for the purpose set forth.

2. In an anti-friction bearing, the roll-carrying rings, pins, and rolls, in combination with the bearing and thrust-plate sleeves, the thrust-plate collar, and the taper pin, substantially as described.

3. In an anti-friction bearing, the axle provided with the bearing-sleeve, the thrust-plate sleeve, and the thrust-plate collar, all being fastened together by means of a single pin, in combination with the thrust-plate and the thrust-plate packings, substantially as described.

4. An anti-friction bearing provided with the bearing-sleeve 21, having the flange 22 and the shoulder 23, the thrust-plate sleeve 24, having the flange 25 and the shoulder 26, and the thrust-plate collar 27, having the flange 28, substantially as and for the purposes set forth.

5. In an anti-friction bearing, the permanently-united roll-carrying rings and roll-carrying pins, each pin carrying rolls of uneven lengths, in combination with the bearing-sleeve, the thrust-plate sleeves, the thrust-plate collar, the tapering pin, and the thrust-plate, and the thrust-plate packings, substantially as and for the purposes set forth.

In testimony whereof I have signed my name to this specification in the presence of two subscribing witnesses.

THOMAS TRIPP.

Witnesses:
WALTER L. PERRY,
J. EDWARD PORTER.